United States Patent
Srinivasan et al.

(10) Patent No.: US 12,450,016 B2
(45) Date of Patent: Oct. 21, 2025

(54) CORRECTIVE READS IMPLEMENTING INCREMENTAL READS WITH RESPECT TO ADJACENT WORDLINES

(71) Applicant: Micron Technology, Inc., Boise, ID (US)

(72) Inventors: Dheeraj Srinivasan, San Jose, CA (US); Luanming Deng, Chengdu (CN)

(73) Assignee: Micron Technology, Inc., Boise, ID (US)

( * ) Notice: Subject to any disclaimer, the term of this patent is extended or adjusted under 35 U.S.C. 154(b) by 173 days.

(21) Appl. No.: 18/125,279

(22) Filed: Mar. 23, 2023

(65) Prior Publication Data

US 2023/0305717 A1    Sep. 28, 2023

Related U.S. Application Data

(60) Provisional application No. 63/323,130, filed on Mar. 24, 2022.

(51) Int. Cl.
| | |
|---|---|
| *G06F 3/06* | (2006.01) |
| *G11C 16/08* | (2006.01) |
| *G11C 16/24* | (2006.01) |
| *G11C 16/26* | (2006.01) |
| *G11C 16/34* | (2006.01) |

(52) U.S. Cl.
CPC .......... *G06F 3/0679* (2013.01); *G11C 16/08* (2013.01); *G11C 16/24* (2013.01); *G11C 16/26* (2013.01); *G11C 16/3418* (2013.01)

(58) Field of Classification Search
CPC ....... G06F 3/0679; G11C 16/08; G11C 16/24; G11C 16/26; G11C 16/3418
See application file for complete search history.

(56) References Cited

U.S. PATENT DOCUMENTS

| | | | |
|---|---|---|---|
| 10,541,035 B1 * | 1/2020 | Lu | G11C 16/0483 |
| 2020/0090764 A1 * | 3/2020 | Ito | G11C 16/10 |

* cited by examiner

*Primary Examiner* — Vanthu T Nguyen
(74) *Attorney, Agent, or Firm* — Lowenstein Sandler LLP

(57) ABSTRACT

A system includes a memory device including a memory array and control logic operatively coupled with the memory array. The memory array includes a target cell connected to a target wordline, a first cell connected to a first adjacent wordline adjacent to the target wordline, and a second cell connected to a second adjacent wordline adjacent to the target wordline. The control logic performs operations including causing a read to be performed with respect to the first cell to obtain an adjacent wordline read result, storing the adjacent wordline read result using a first set of page buffers, causing an incremental read to be performed with respect to the second cell and a first bin to obtain a first incremental read result, and storing the first incremental read result using a second set of page buffers.

11 Claims, 9 Drawing Sheets

CORRECTIVE READS IMPLEMENTING INCREMENTAL READS WITH RESPECT TO ADJACENT WORDLINES

CROSS-REFERENCE TO RELATED APPLICATION(S)

The present application claims the benefit of U.S. Provisional Application 63/323,130, filed on Mar. 24, 2022 and entitled "CORRECTIVE READS IMPLEMENTAL INCREMENTAL READS WITH RESPECT TO ADJACENT WORDLINES", the entire contents of which are incorporated herein by reference.

TECHNICAL FIELD

Embodiments of the disclosure relate generally to memory sub-systems, and more specifically, relate to performing corrective reads implementing incremental reads with respect to adjacent wordlines.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
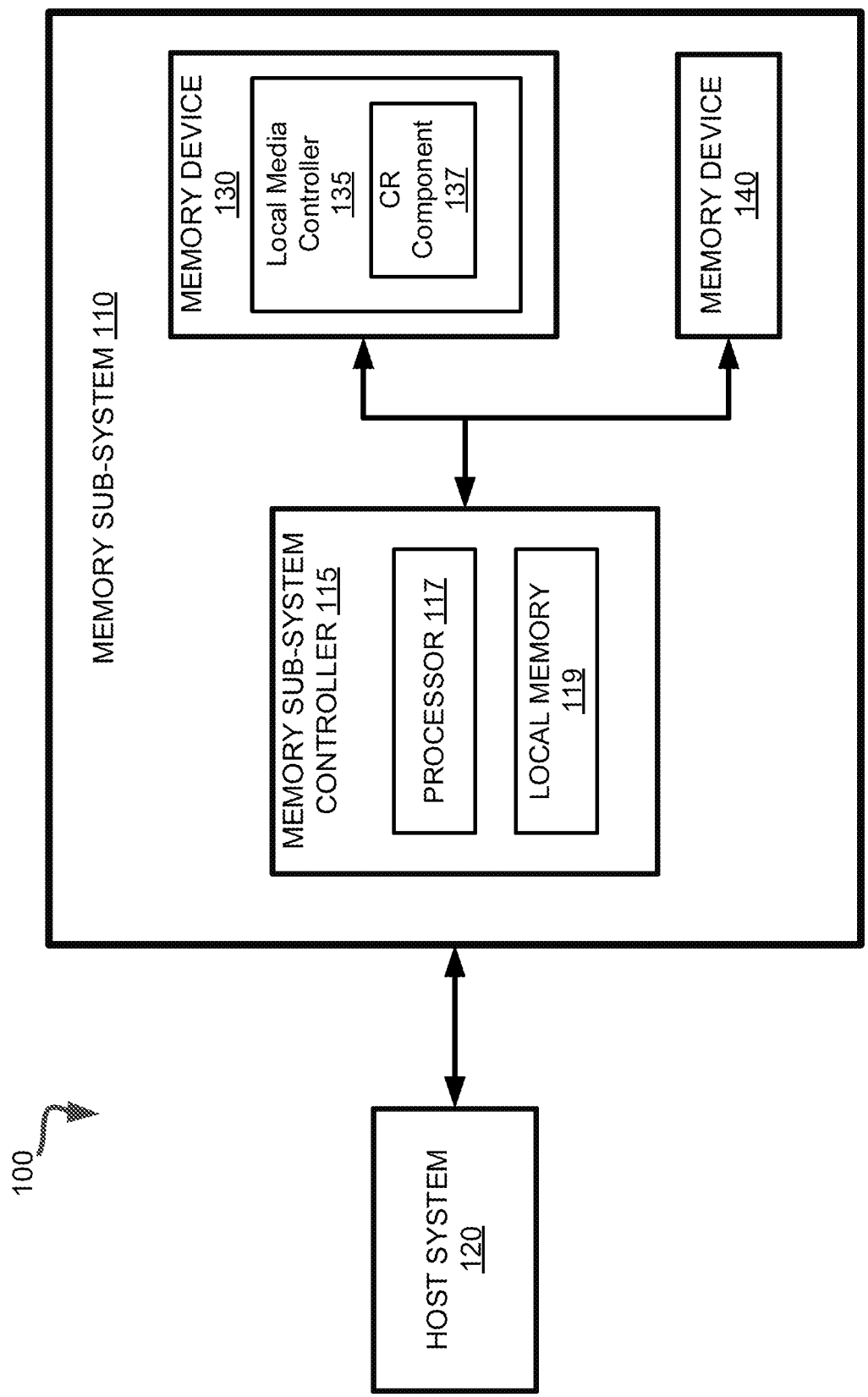
FIG. 1A illustrates an example computing system that includes a memory sub-system in accordance with some embodiments of the present disclosure.

Aspects of the present disclosure are directed to corrective reads implementing incremental reads with respect to an adjacent wordline. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. Memory cells are etched onto a silicon wafer in an array of columns and rows. A memory device can further include conductive lines connected to respective ones of the memory cells, referred to as wordlines and bitlines. A wordline can refer to one or more rows of memory cells of the memory device and a bitline can refer to one or more columns of memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g. oxide) layer. A 3D memory device can have a "top deck" corresponding to a first side and a "bottom deck" corresponding to a second side. Without loss of generality, the first side can be a drain side and the second side can be a source side. For example, a 3D memory device can be a 3D replacement gate memory device having a replacement gate structure using wordline stacking.

One type of memory cell ("cell") is a single level cell (SLC), which stores 1 bit per cell and defines 2 data states ("states") ("0" and "1") each corresponding to a respective threshold voltage ($V_t$) distribution. For example, the "1" state can be an erased state and the "0" state can be a programmed state. Another type of cell is a multi-level cell (MLC), which stores 2 bits per cell and defines 4 states ("01", "00", "10" and "11") each corresponding to a respective $V_t$ distribution. For example, the "11" state can be an erased state and the "01", "00" and "10" states can each be a respective programmed state. Another type of cell is a triple level cell (TLC), which stores 3 bits per cell and defines 8 states ("011", "010", "000", "001", "101", "100", "110", "111") each corresponding to a respective $V_t$ distribution. For example, the "111" state can be an erased state and each of the other states can be a respective programmed state. Another type of a cell is a quad-level cell (QLC), which stores 4 bits per cell and defines 16 states. Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of memory cells.

A read window, or valley margin, refers to a voltage distance between a pair of adjacent $V_t$ distributions. For example, in a SLC cell, there is 1 read window that exists with respect to the 2 $V_t$ distributions. As another example, in an MLC cell, there are 3 read windows that exist with respect to the 4 $V_t$ distributions. As yet another example, in a TLC cell, there are 7 read windows that exist with respect to the 8 $V_t$ distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows.

Cell-to-cell interference may exist between neighboring memory cells ("cells") of a memory array. For example, the $V_t$ distributions of a cell can be affected by adjacent cells as a result of lateral charge migration (e.g., electron migration), referred to as $V_t$ distribution shift. Cell-to-cell interference, in addition to intrinsic charge loss observed within a particular cell, can each lead to a widening of $V_t$ distributions of the cell. The $V_t$ widening can lead to loss of RWB (e.g., RWB degradation), which can negatively affect memory device reliability.

One mechanism for compensating for the widening observed due to cell-to-cell interference and intrinsic charge loss is corrective read. Corrective read can be performed with respect to a target wordline cell connected to a target wordline. More particularly, corrective read leverages the state of at least one of the adjacent wordline cells connected to a pair of adjacent wordlines relative to the target wordline. For example, a first adjacent wordline can be located directly above the target wordline and a second adjacent wordline can be located directly below the target wordline. The adjacent wordlines can be referred to as aggressor wordlines. The target wordline can be referred to as an n-th wordline ($WL_n$), such that each adjacent cell is connected to a respective adjacent wordline n−1 ($WL_{n-1}$) and adjacent wordline n+1 ($WL_{n+1}$).

Generally, corrective read can be performed by reading at least one of the adjacent wordline cells with a read voltage applied to their gate electrodes, determining an appropriate read level offset for reading the target wordline cell based on the reading, and applying the read level offset to read the target wordline cell. The read level offset can be determined by obtaining m-bit information indicating a $V_t$ level or state of the adjacent wordline cell. When the target wordline cell is read with a read voltage applied to its gate electrode, the target wordline cell can be read a number of times with different adjusted or offset read levels based on the m-bit information from each adjacent cell. For example, a number of bins of $V_t$ levels can be defined using the m-bit information from each adjacent cell. Each bin can include a first subset of $V_t$ levels for the cell connected to the adjacent wordline $WL_{n-1}$ and a second subset of $V_t$ levels for the cell connected to the adjacent wordline $WL_{n+1}$. Each bin defines a different read level offset. Therefore, the number of reads performed with respect to the target wordline cell can be equal to the number of bins.

One example of corrective read is 1-bit corrective read (1BCR). To implement 1BCR, a single strobe read is applied to a single adjacent wordline cell (e.g., a cell connected to one of the adjacent wordlines $WL_{n-1}$ and $WL_{n+1}$). The single strobe read obtains 1-bit information indicative of the $V_t$ level or state of the single adjacent wordline cell, which defines 2 total bins. For example, for a QLC cell implementation in which there are 16 total possible states L0-L15, a first bin can include states L0-L7 for the adjacent wordline cell and a second bin can include states L7-L15 for the adjacent wordline cell. Then, the target wordline (e.g., the cell of the target wordline $WL_n$) can be read twice (e.g., with 3 strobes each read for a 3 strobe page type). The 2 reads can be performed using 2 different read level offsets, each determined from a respective one of the 2 bins.

Another example of corrective read is 2-bit corrective read (2BCR). One way to implement 2BCR is by applying a three strobe read to a single adjacent wordline cell. The three strobe read can obtain 2-bit information indicative of the $V_t$ level or state of the single adjacent wordline cell, which defines 4 total bins. For example, for a QLC cell implementation in which there are 16 total possible states L0-L15, a first bin can include states L0-L3 for the adjacent wordline cell, a second bin can include states L4-L7 for the adjacent wordline cell, a third bin can include states L8-L11 for the adjacent wordline cell, and a fourth bin can include states L12-L15 for the adjacent wordline cell. Then, the target wordline can be read 4 times (e.g., with 3 strobes each read for a 3 strobe page type). The 4 reads can be performed using 4 different read level offsets, each determined from a respective one of the 4 bins.

Another way to implement 2BCR is by obtaining 1-bit information indicative of the $V_t$ level or state of each of the adjacent wordline cells (e.g., from each of cells connected to the adjacent wordlines $WL_{n-1}$ and $WL_{n+1}$), which totals 2 bits. More specifically, each of the adjacent wordline cells are read once to obtain the respective 1-bit information, which defines 4 total bins. For example, for a QLC cell implementation in which there are 16 total possible states L0-L15, a first bin can include states L0-L7 for the cell connected to adjacent wordline $WL_{n-1}$ and states L0-L7 for the cell connected to adjacent wordline $WL_{n+1}$, a second bin can include states L0-L7 for the cell connected to adjacent wordline $WL_{n-1}$ and states L7-L15 for the cell connected to adjacent wordline $WL_{n+1}$, a third bin can include states L7-L15 for the cell connected to adjacent wordline $WL_{n-1}$ and states L0-L7 for the cell connected to adjacent wordline $WL_{n+1}$, and a fourth bin can include states L7-L15 for the cell connected to adjacent wordline $WL_{n-1}$ and states L7-L15 for the cell connected to adjacent wordline $WL_{n+1}$. Then, the target wordline can be read 4 times (e.g., with 3 strobes each read for a 3 strobe page type). The 4 reads can be performed using 4 different read level offsets, each determined from a respective one of the 4 bins.

Another example of corrective read is 4-bit corrective read (4BCR). To implement 4BCR, a 3 strobe read is applied to each of the adjacent wordline cells to obtain 2-bit information indicative of the $V_t$ level or state of each cell (therefore 4 total bits), which defines 16 total bins. For example, for a QLC cell implementation in which there are 16 total possible states L0-L15, the 16 total bins can include a first bin that includes states L0-L3 for the cell connected to adjacent wordline $WL_{n-1}$ and states L0-L3 for the cell connected to adjacent wordline $WL_{n+1}$, a second bin that includes states L0-L3 for the cell connected to adjacent wordline $WL_{n-1}$ and states L4-L7 for the cell connected to adjacent wordline WL, +4 $WL_{n+1}$, a third bin that includes states L0-L3 for the cell connected to adjacent wordline $WL_{n-1}$ and states L8-L11 for the cell connected to adjacent wordline $WL_{n+1}$, and a fourth bin that includes states L0-L3 for the cell connected to adjacent wordline $WL_{n-1}$ and states L12-L15 for the cell connected to adjacent wordline $WL_{n+1}$, etc. The other 12 bins can be generated with other similar combinations of states. Then, the target wordline can be read 16 times (e.g., with 3 strobes each read for a 3 strobe page type). The 16 reads can be performed using 16 different read level offsets, each determined from a respective one of the 4 bins.

The information obtained by reading the adjacent wordline cells can be stored in page buffers. For example, a page buffer can be a static page buffer (SPB). Illustratively, in 4BCR, 4 page buffers (e.g., SPBs) can be used to store the 2 sets of 2-bit bin information obtain from the adjacent wordline cells.

In some implementations, a memory device (e.g., 3D replacement gate memory device) can have 4 total page buffers that can be used to store information. For example, the page buffers can include a combination of primary and secondary data caches. In some implementations, the page buffers can include a first primary data cache, a second primary data cache, a third primary data cache, and a secondary data cache. However, in such implementations, one page buffer is generally reserved for storing read results corresponding to the target wordline ($WL_n$) (e.g., the third primary data cache). Therefore, to implement 4BCR with respect to memory devices utilizing 4 total page buffers, only 3 of the 4 page buffers are available to store the 2-bit bin information for each of the cells connected to the adjacent wordlines $WL_{n-1}$ and $WL_{n+1}$. Accordingly, some memory devices may have an insufficient number of available page buffers to store the bin information obtained during corrective read.

Aspects of the present disclosure address the above and other deficiencies by performing corrective reads implementing incremental reads with respect to an adjacent wordline. For example, assume that 4BCR is being performed with respect to a memory device having 4 total page buffers (e.g., SPBs) with 1 page buffer reserved for storing read results corresponding to a target wordline $WL_n$. However, the corrective read described herein can be applied to any suitable number of bits and the memory device can have any suitable number of page buffers.

For a first adjacent wordline of a pair of adjacent wordlines with respect to the target wordline (e.g., $WL_{n+1}$ or $WL_{n-1}$), a local media controller causes a cell connected to the first adjacent wordline to be read to obtain 2-bit information reflective of a state of the cell. A first bit of the 2-bit result can be stored in a first page buffer and a second bit of the 2-bit result can be stored in a second page buffer. For example, the first page buffer can be a primary data cache and the second page buffer can be a secondary data cache.

After the 2-bit result of the first adjacent wordline read has been stored, the local media controller can cause an incremental read to be performed with respect to a second adjacent wordline of the pair of adjacent wordlines (e.g., $WL_{n-1}$ or $WL_{n+1}$). More specifically, a number of incremental read loops ("loops") are performed each corresponding to a respective target bin. Instead of the 2-bit information that was obtained with respect to the first adjacent wordline, each loop generates 1-bit information, which is then stored in a third page buffer. For example, the third page buffer can be a second primary data cache different from the first primary data cache.

More specifically, each loop for a target bin focuses on one $V_t$ distribution at a time, where bits having a $V_t$ belonging to the target bin will be set as 1 and other bits will be cleared. After a first loop is performed with respect to a first bin (the target bin for the first loop), which generates a first 1-bit result stored at the third page buffer, the local media controller causes a first read to be performed on a cell connected to the target wordline $W_n$ to obtain a first read result that is stored at a fourth page buffer. For example, the fourth page buffer can be a third primary data cache different from the first and second primary data caches. Then, the local media controller causes a second loop to be performed for a second target bin (the target bin for the second loop) to generate a second 1-bit result that is stored at the third page buffer, and further causes a second read to be performed on the cell connected to the target wordline $W_n$ to obtain a second read result. The number of loops is equal to the number of bins. For example, in this 4BCR example, there are four bins and thus four total loops. Further details regarding this process are described herein below with reference to FIGS. 1-5.

Advantages of the present disclosure include, but are not limited to, improved memory device defect detection, and improved memory device reliability.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The local media controller 135 can implement a corrective read (CR) component 137 that can perform corrective reads implementing incremental reads. For example, the CR component 137 can perform a read with respect to a first adjacent wordline adjacent to a target wordline to obtain and store a first read result. For example, if the target wordline is $W_n$, then the adjacent aggressor wordline can be either adjacent wordline $W_{n+1}$ or adjacent wordline $W_{n-1}$. The first read result can be stored in a first set of page buffers (e.g., SPBs). For example, if the corrective read is 4BCR and the first read result is a 2-bit result, then the first set of page buffers can include a first page buffer and a second page buffer for storing the 2-bit result. In some embodiments, the first page buffer is a first primary data cache and the second page buffer is a secondary data cache.

The CR component 137 can then perform an incremental read loop ("loop") with respect to a second adjacent wordline adjacent to the target wordline and a first bin ("first bin") to obtain and store a first incremental read result. For example, the second aggressor wordline can be the other of aggressor wordline $W_{n+1}$ or aggressor wordline $W_{n-1}$. The first incremental read result can be stored in a second set of page buffers (e.g., SPBs). For example, if the corrective read is 4BCR and the first incremental read result is a 1-bit result, then the second set of page buffers can include a third page buffer for storing the 1-bit result. In some embodiments, the third page buffer is a second primary data cache different from the first primary data cache. The CR component 137 can then perform a read with respect to the target wordline to obtain and store a second read result. The second read result can be stored in a fourth page buffer designated for storing the results of reads performed with respect to the target wordline. In some embodiments, the fourth page buffer is a third primary data cache different from both the first and second primary data caches.

If there are additional sets of memory cells remaining (e.g., additional bins), the CR component 137 can then perform another loop with respect to the second adjacent wordline and a second bin (e.g., second bin). The number of loops is equal to the number of sets of memory cells, such that the incremental read process will end once an incremental read is performed with respect to each bin. In each loop, only bits with a $V_t$ belonging to the corresponding bin will be set to "1" while all other bits will be cleared. Further details regarding the operations of the CR component 137 will be described below with reference to FIGS. 4-5.

Figure 1B:
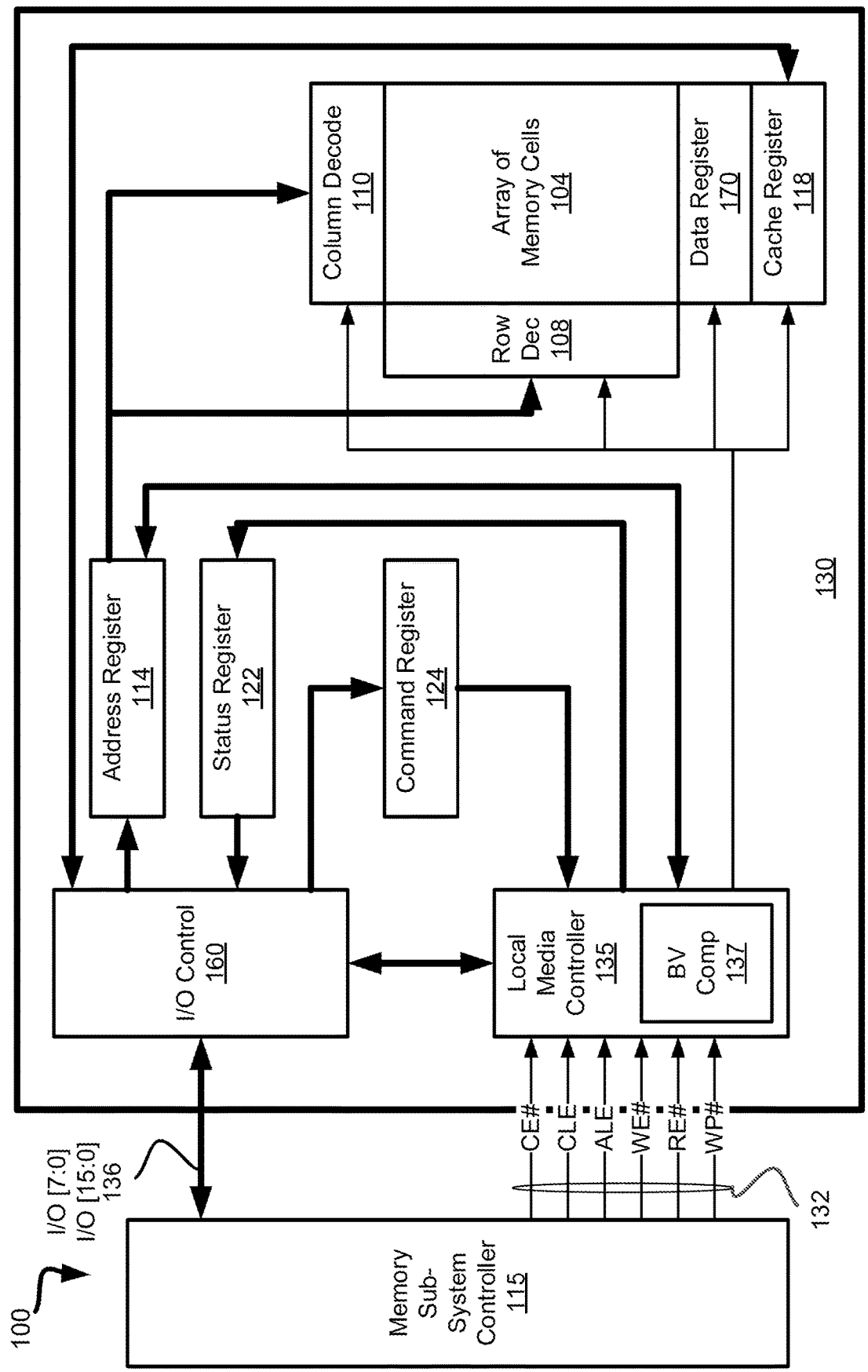
FIG. 1B is a block diagram of a memory device in communication with a memory sub-system controller of a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 110 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 110 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes the CR component 137, which can implement the defect detection described herein during an erase operation on memory device 130.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 204, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
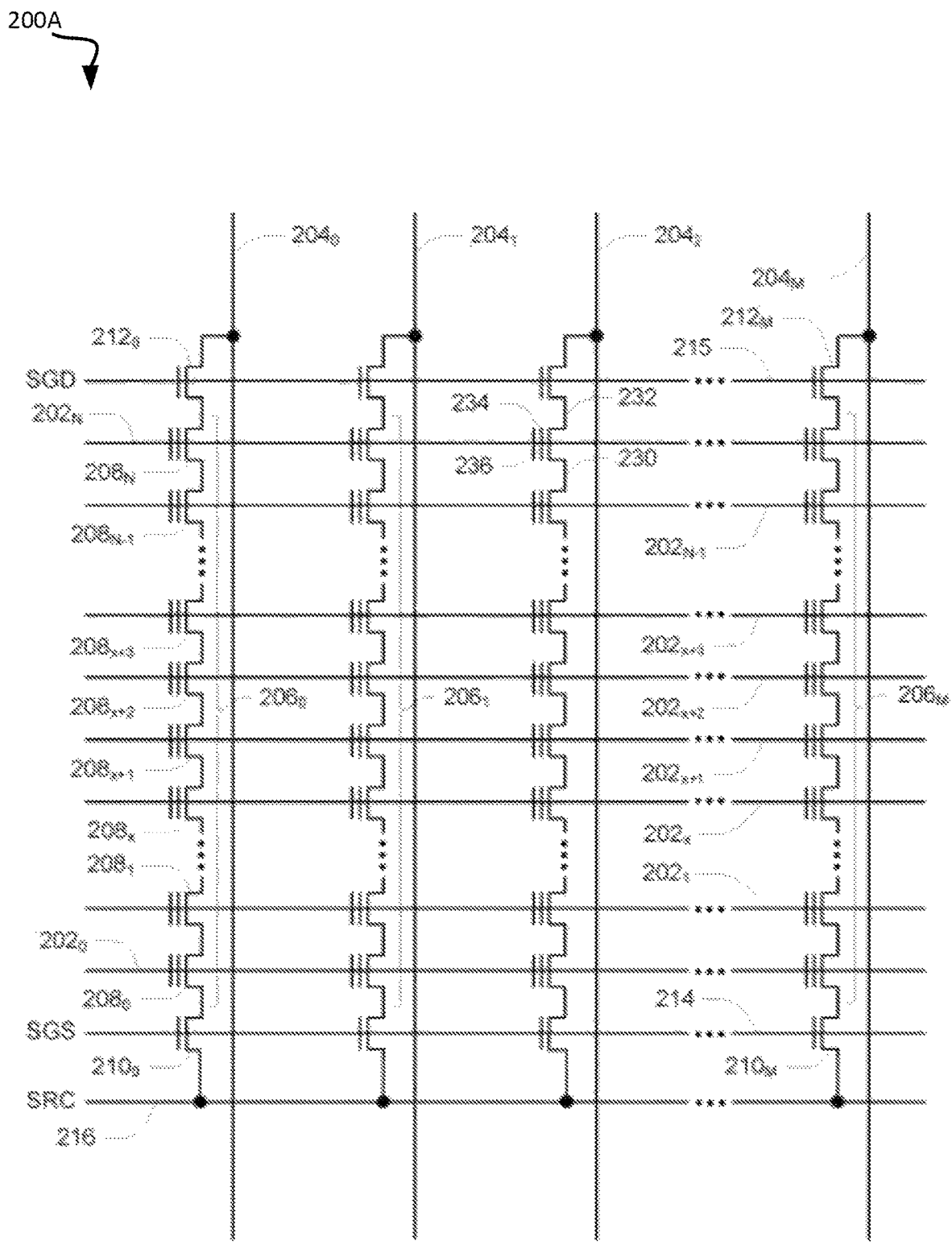
FIGS. 2A-2C are diagrams of portions of an example array of memory cells included in a memory device, in accordance with some embodiments of the present disclosure.
Figure 2B:
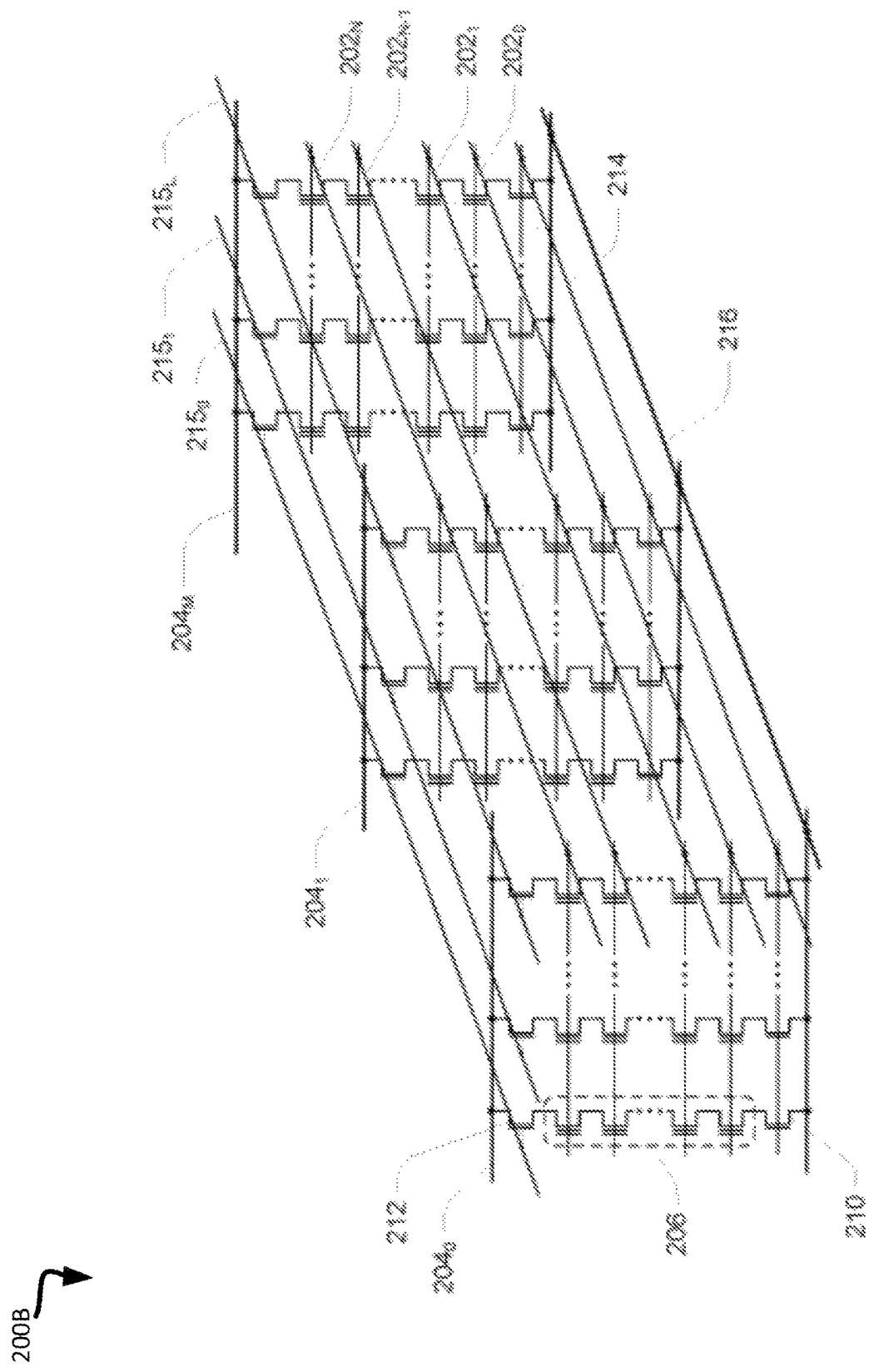
Figure 2C:
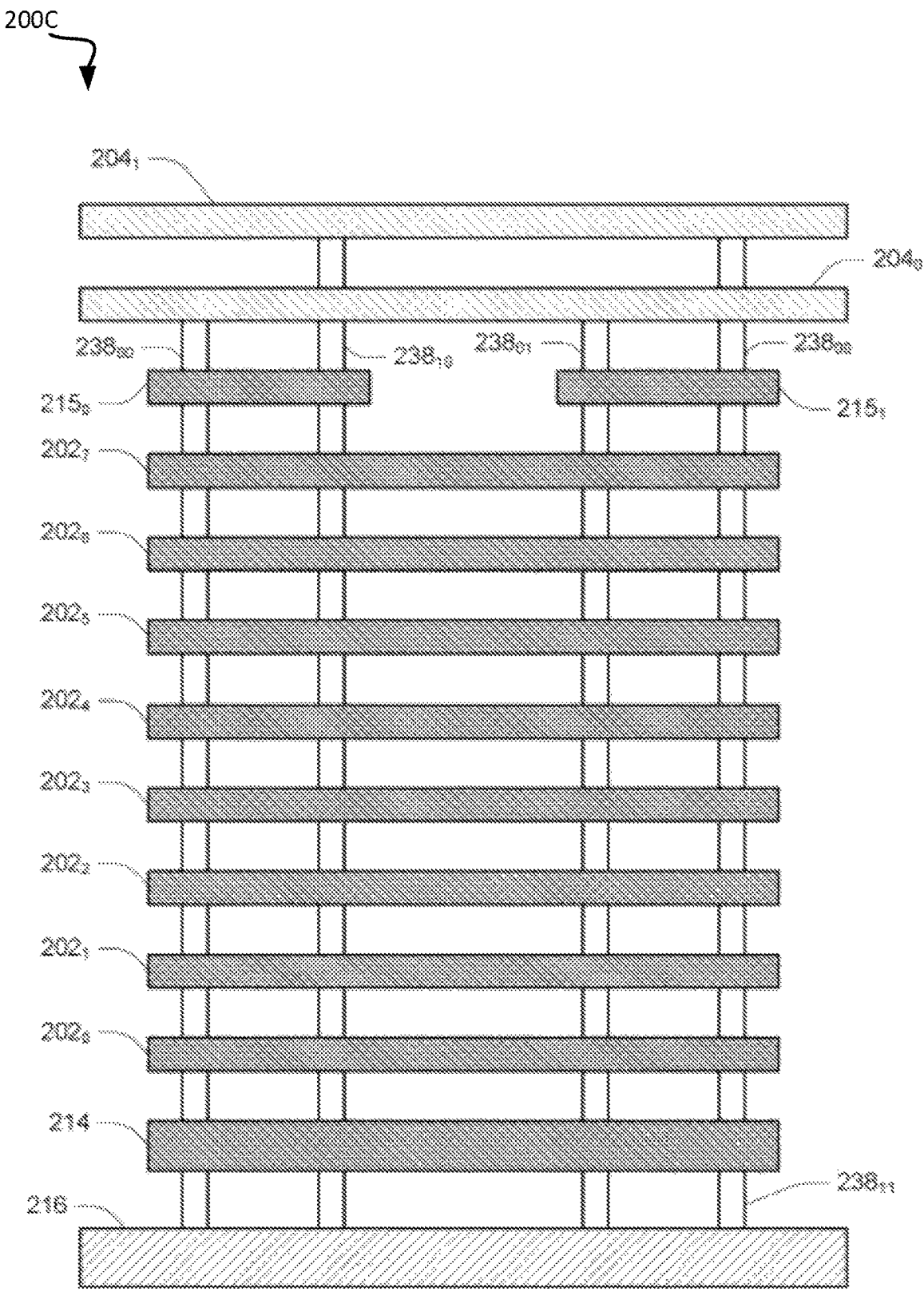

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected to a given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, segmented channel regions with interposed conductive regions, etc.

Figure 3:
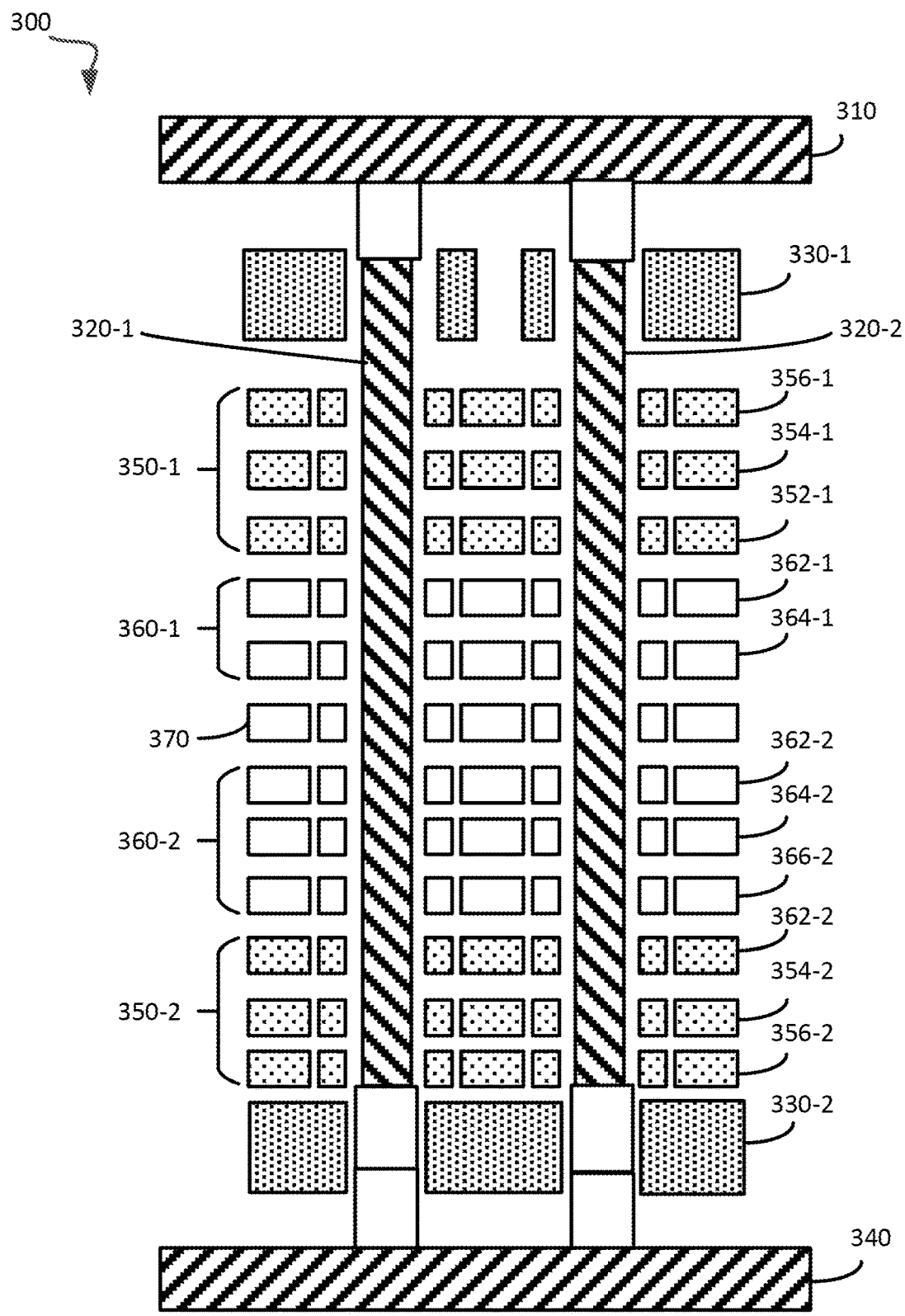
FIG. 3 is a diagram of an example three-dimensional (3D) replacement gate memory device that can enable performance of corrective reads implementing incremental reads, in accordance with some embodiments of the present disclosure.

FIG. 3 is a diagram of an example three-dimensional (3D) replacement gate memory device ("device") 300, in accordance with some embodiments of the present disclosure. However, the embodiments described herein can be applied to any suitable memory device. As shown, the device 300 includes a bitline 310, pillars 320-1 and 320-2, select gates (SGs) 330-1 and 330-2, a source line (SRC) 340, and WL groups 350-1, 350-2, 360-1 and 360-2. More specifically, WL groups 350-1 and 350-2 are dummy WL groups, and WL groups 360-1 and 360-2 are active WL groups. WL group 350-1 includes dummy WLs 352-1 through 366-1, WL group 650-2 includes dummy WLs 352-2 through 356-2, WL group 360-1 includes active WLs 362-1 and 364-1, and WL group 360-2 includes active WLs 362-2, 364-2 and 366-2. However, such an example should not be considered limiting. A dummy WL corresponds to memory cells that do not store data and are included to satisfy processing margins, while an active WL corresponds to memory cells that store data.

As further shown, a WL 370 is provided. In some embodiments, the device 300 is a multiple deck device, in which WL groups 350-1 and 360-1 are associated with a first deck (e.g., an upper deck) of the device 300 and the WL groups 350-2 and 360-2 are associated with a second deck (e.g., a lower deck) of the device 300, such that the WL 370 corresponds to a dummy WL separating the WL groups 360-1 and 360-2. In other embodiments, the device 300 is a "single deck" device, in which the WL groups 360-1 and 360-2 are not arranged in decks. Here, the WL 370 can be an active WL within one of the WL groups 360-1 or 360-2.

Figure 4:
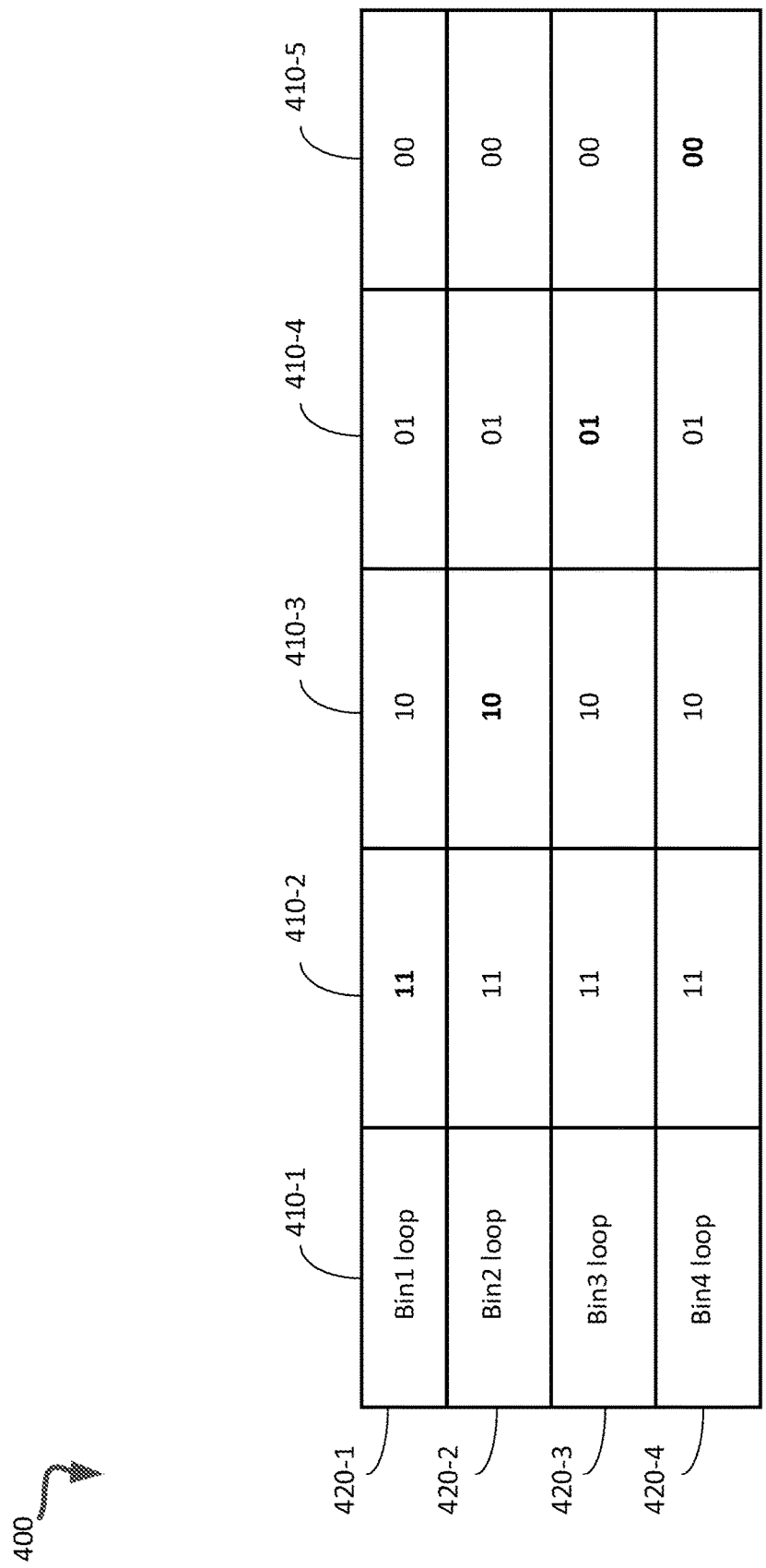
FIG. 4 is a diagram of a table illustrating an example performance of a corrective read implementing incremental reads, in accordance with some embodiments of the present disclosure.

FIG. 4 is a diagram of a table 400 illustrating an example implementation of incremental read loops performed with respect to an adjacent wordline, in accordance with some embodiments of the present disclosure. It is assumed in this illustrative example that 4BCR is being performed with respect to an MLC cell, such that there are four total bins Bin1, Bin2, Bin3 and Bin4. However, this example should not be considered limiting.

As shown, the table 400 includes a number of columns 410-1 through 410-5 and a number of rows 420-1 through 420-4. The entries at the intersection of column 410-1 and rows 420-1 through 420-4 indicate respective loops for each of the bins, denoted as Bin1 loop, Bin2 loop, Bin3 loop and Bin4 loop. The entries at the intersection of row 520-1 and columns 410-2 through 410-5 indicate the information stored during the Bin1 loop, the entries at the intersection of row 420-2 and columns 410-2 through 410-5 indicate the information stored during the Bin2 loop, the entries at the intersection of row 420-3 and columns 410-2 through 410-5 indicate the information stored during the Bin3 loop, and the entries at the intersection of row 420-4 and columns 410-2 through 410-5 indicate the information stored during the Bin4 loop.

In each loop, only bits whose $V_t$ belongs to the current target bin will be set as 1, and other bits will be cleared. Once the cell connected to $WL_{n+1}$ is read, a nested loop will be executed to complete the corrective read (e.g., 4BCR). More specifically, each bin corresponds to a particular incremental read loop ("loop") to be performed with respect to a cell connected to an adjacent wordline $WL_{n-1}$. Therefore, 4 $WL_{n-1}$ loops are implemented to cover the 4 bins for the cell connected to $WL_{n-1}$, and within each $WL_{n-1}$ loop, 4 $WL_n$ loops are implemented to cover the 4 bins for the cell connected to $WL_{n+1}$. Therefore, the table 400 includes 16 total entries covering all 16 cases. As shown, the entries in column 410-2 are all "11", the entries in column 410-3 are "10", the entries in column 410-4 are "01", and the entries in column 510-5 are "00". The highlighted entries are reflective of the MLC $V_t$ distribution (e.g., states "11", "10", "01", "00") and which $V_t$ distribution the cell connected to the adjacent wordline $WL_{n-1}$ falls into.

Figure 5:
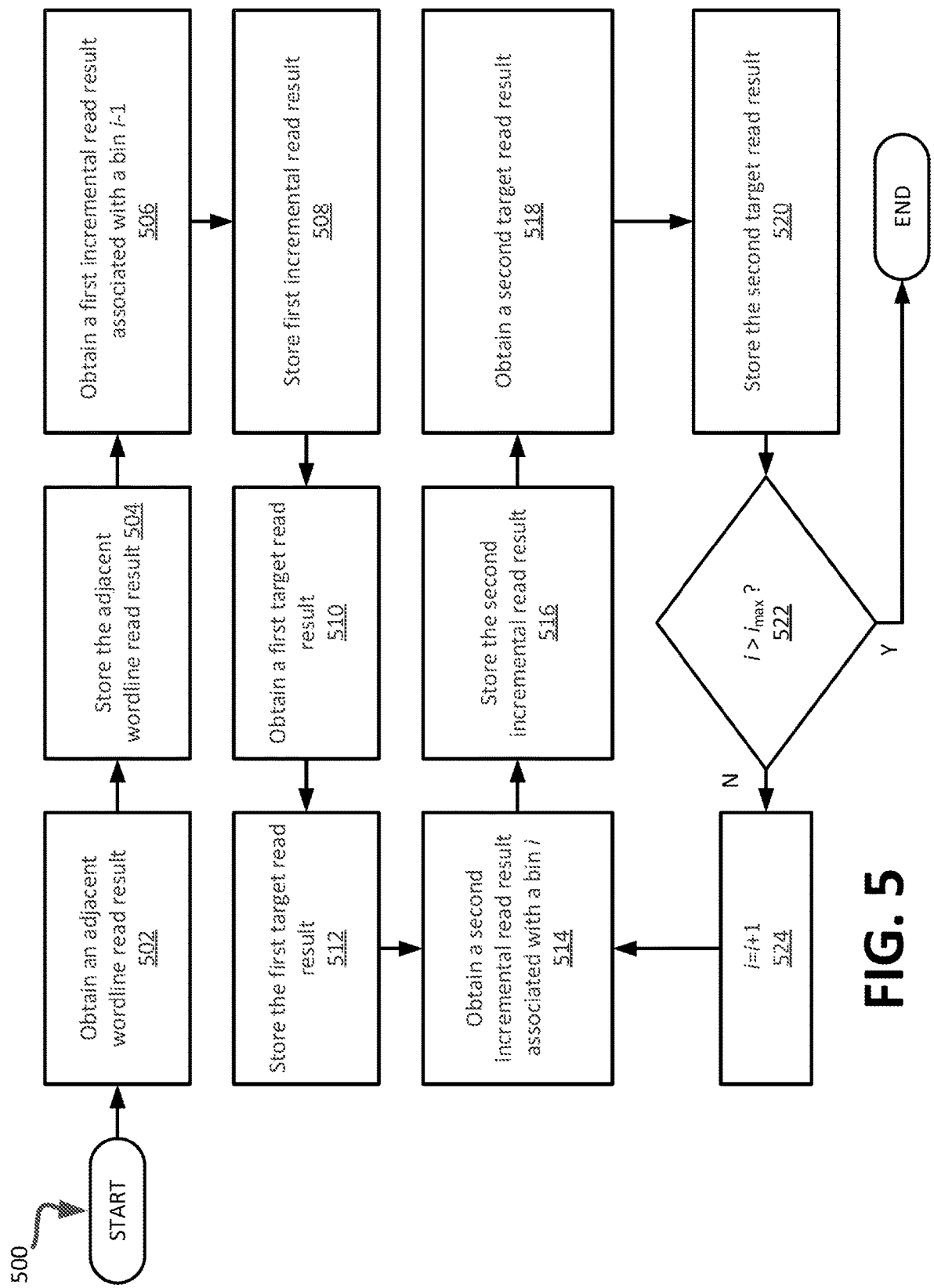
FIG. 5 is a flow diagram of an example method to perform a corrective read implementing incremental reads, in accordance with some embodiments of the present disclosure.

FIG. 5 is a flow diagram of an example method 500 to perform a corrective read implementing incremental reads with respect to an adjacent wordline, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the CR component 137 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, an adjacent wordline read result associated is obtained and, at operation 504, the adjacent wordline read result is stored. For example, the processing logic (e.g., CR component 137) can cause a read to be performed with respect to a cell connected to first adjacent wordline adjacent to a target cell connected to a target wordline to obtain the adjacent wordline read result, and can cause the adjacent wordline read result to be stored. The cell connected to the first adjacent wordline can be vertically adjacent to the target cell (e.g., above or below). The adjacent wordline read result can be stored in a first set of page buffers (e.g., SPBs). For example, if the corrective read is 4BCR and the adjacent wordline read result is a 2-bit result, then the first set of page buffers can include a first page buffer and a second page buffer for storing the 2-bit result. In some embodiments, the first page buffer is a first primary data cache and the second page buffer is a secondary data cache.

At operation 506, a first incremental read result associated with a bin i−1 is obtained and, at operation 508, the first incremental read result is stored. For example, the processing logic can cause an incremental read to be performed with respect to a cell connected to a second adjacent wordline adjacent to the target cell to obtain the first incremental read result, and can cause the first incremental read result to be stored. The bin i−1 can be referred to as a first bin (e.g., a first bin). The first incremental read result can be stored in a second set of page buffers. For example, if the corrective read is 4BCR and the first incremental read result is a 1-bit result, then the second set of page buffers can include a third page buffer for storing the 1-bit result. In some embodiments, the third page buffer is a second primary data cache different from the first primary data cache.

At operation 510, a first target read result is obtained and, at operation 512, the first target read result is stored. For example, the processing logic can cause a read to be performed with respect to the target cell to obtain the first target read result, and can cause the first target read result to be stored. The first target read result can be stored in a fourth page buffer (e.g., SPB). In some embodiments, the fourth page buffer is a third primary data cache different from both the first and second primary data caches.

Operations 508-512 correspond to a first incremental read loop ("loop"). As will be described in further detail below, the number of loops is equal to the number of bins, such that the process will end after an incremental read is performed with respect to each bin. In each loop, only bits with a $V_t$ belonging to the corresponding bin will be set to "1" while all other bits will be cleared.

At operation 514, a second incremental read result associated with a bin i is obtained and, at operation 516, the second incremental read result is stored. For example, the processing logic can cause the incremental read to be performed with respect to the cell connected to the second adjacent wordline to obtain the second incremental read result, and can cause the second incremental read result to be stored. The bin i can be referred to as a second bin (e.g., a second bin). The second incremental read result can be stored in the second set of page buffers (e.g., the third page buffer), as described above with respect to operation 508.

At operation 518, a second target read result is obtained and, at operation 520, the second target read result is stored. For example, the processing logic can cause a read to be performed with respect to the target cell to obtain the second read result, and can cause the second target read result to be stored. The second target read result can be stored in the fourth page buffer, as described above with respect to operation 512.

At operation 522, it is determined whether the counter i exceeds the total number of bins ($i_{max}$). That is, it is determined whether the current bin, bin i (e.g., the second bin) is the last remaining bin to be addressed during the corrective read. If not, this means that another incremental read loop should be performed with respect to the next bin, bin i+1. Thus, the counter i is updated to i+1 at operation 524, and the process reverts back to operation 514 to perform another loop. If the current bin is the last remaining bin, then no more loops need to be performed and the corrective read process ends.

Figure 6:
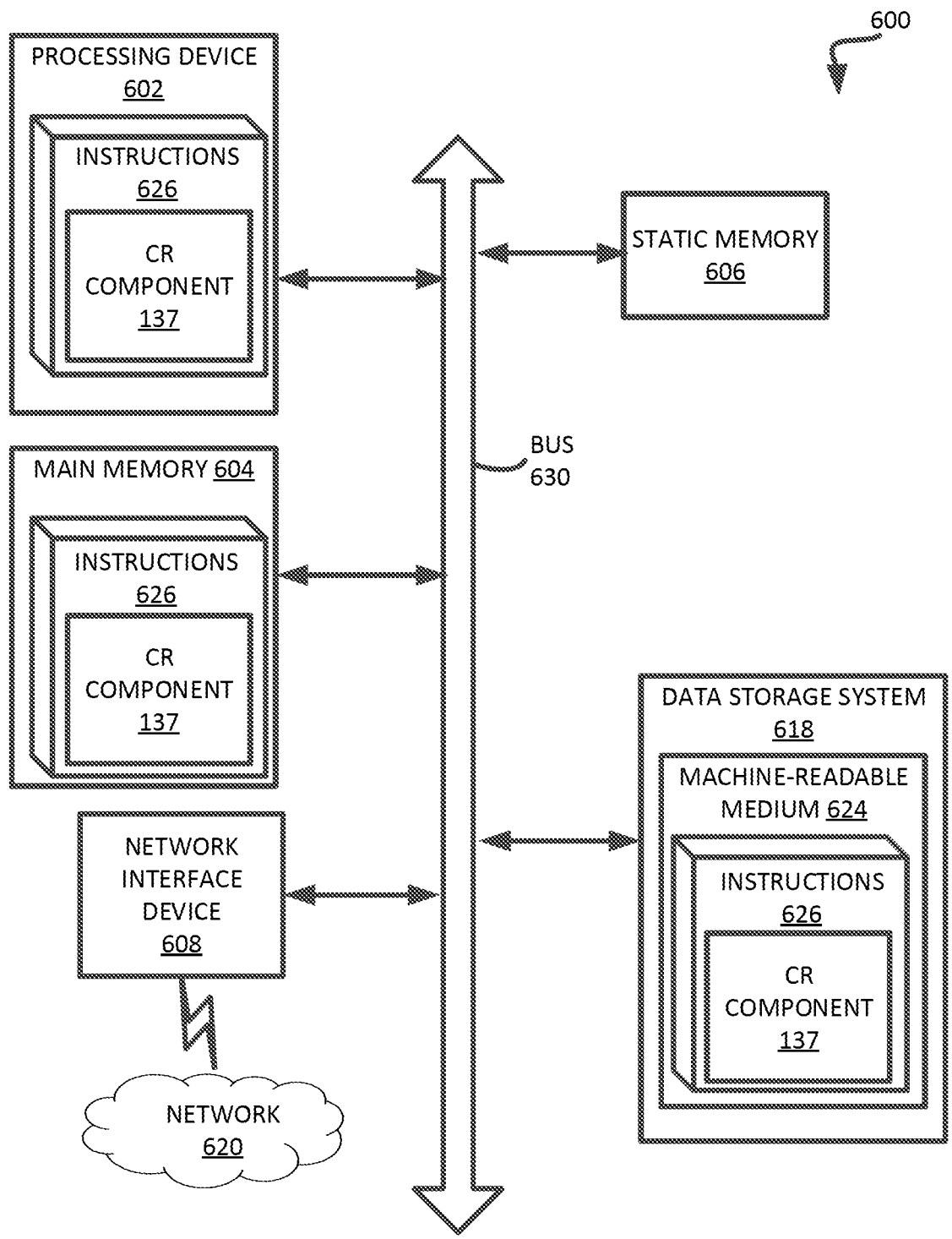
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the CR component 137 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to a CR component (e.g., the CR component 137 of FIG. 1A). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a memory array comprising a target cell connected to a target wordline, a first cell connected to a first adjacent wordline adjacent to the target wordline, and a second cell connected to a second adjacent wordline adjacent to the target wordline; and
   control logic, operatively coupled with the memory array, to perform operations comprising:

causing a read to be performed with respect to the first cell to obtain an adjacent wordline read result having a first number of bits;

storing a first bit of the adjacent wordline read result to a first primary data cache, and a second bit of the adjacent wordline read result to a secondary data cache;

causing an incremental read to be performed with respect to the second cell to obtain a first incremental read result having a second number of bits that is less than the first number of bits;

storing the first incremental read result to a second primary data cache;

causing a read to be performed on the target cell to obtain a target cell read result; and storing the target cell read result to a third primary data cache.

2. The memory device of claim 1, wherein the adjacent wordline read result is a 2-bit result, and wherein the first incremental read result is a 1-bit result.

3. The memory device of claim 1, wherein the incremental read is performed using a first read voltage assigned to a first bin, and wherein the operations further comprise:

determining whether the first bin is a final bin;

in response to determining that the first bin is not the final bin, causing, using a second read voltage assigned to a second bin, an incremental read to be performed with respect to the second cell and a second bin to obtain a second incremental read result; and storing the second incremental read result to the second primary data cache.

4. The memory device of claim 1, wherein the memory device comprises a three-dimensional replacement gate memory device.

5. A method comprising:

causing, by a processing device, a read to be performed with respect to a first cell connected to a first adjacent wordline to obtain an adjacent wordline read result having a first number of bits, wherein the first cell is adjacent to a target cell of a target wordline;

storing, by the processing device, a first bit of the adjacent wordline read result to a first primary data cache, and a second bit of the adjacent wordline read result to a secondary data cache;

causing, by the processing device, an incremental read to be performed with respect to a second cell connected to a second adjacent wordline to obtain a first incremental read result having a second number of bits that is less than the first number of bits, wherein the second cell is adjacent to the target cell;

storing, by the processing device, the first incremental read result to a second primary data cache;

causing, by the processing device, a read to be performed on the target cell to obtain a target cell read result; and storing, by the processing device, the target cell read result to a third primary data cache.

6. The method of claim 5, wherein the adjacent wordline read result is a 2-bit result, and wherein the first incremental read result is a 1-bit result.

7. The method of claim 5, wherein the incremental read is performed using a first read voltage assigned to a first bin, and wherein the method further comprises:

determining, by the processing device, whether the first bin is a final bin;

in response to determining that the first bin is not the final bin, causing, by the processing device using a second read voltage assigned to a second bin, an incremental read to be performed with respect to the second cell to obtain a second incremental read result; and storing, by the processing device, the second incremental read result to the second primary data cache.

8. The method of claim 5, wherein the processing device is associated with a three-dimensional replacement gate memory device.

9. A non-transitory computer-readable storage medium comprising instructions that, when executed by a processing device, cause the processing device to perform operations comprising:

obtaining an adjacent wordline read result corresponding to a read performed with respect to a first cell connected to a first adjacent wordline, wherein the first cell is adjacent to a target cell connected to a target wordline, wherein the adjacent wordline read result has a first number of bits, and wherein obtaining the adjacent wordline read result comprises storing a first bit of the adjacent wordline read result to a first primary data cache, and a second bit of the adjacent wordline read result to a secondary data cache;

in response to obtaining the adjacent wordline read result, obtaining a first incremental read result corresponding to an incremental read performed with respect to a second cell connected to a second adjacent wordline, wherein the second cell is adjacent to the target cell, wherein the first incremental read result has a second number of bits that is less than the first number of bits, and wherein obtaining the first incremental read result comprises storing the first incremental read result to a second primary data cache; and in response to obtaining the first incremental read result, obtaining a target cell read result corresponding to a read performed with respect to the target cell, wherein obtaining the target cell read result comprises storing the target cell read result to a third primary data cache.

10. The non-transitory computer-readable storage medium of claim 9, wherein the adjacent wordline read result is a 2-bit result, and wherein the first incremental read result is a 1-bit result.

11. The non-transitory computer-readable storage medium of claim 9, wherein the incremental read is performed using a first read voltage assigned to a first bin, and wherein the operations further comprise:

determining whether the first bin is a final bin;

in response to determining that the first bin is not the final bin, causing, using a second read voltage assigned to a second bin, an incremental read to be performed with respect to the second cell to obtain a second incremental read result; and storing the second incremental read result to the second primary data cache.

* * * * *